United States Patent [19]

Gault et al.

[11] Patent Number: 5,154,742
[45] Date of Patent: Oct. 13, 1992

[54] OIL MIST AND SMOKE COLLECTOR

[76] Inventors: William J. Gault, 144 Roth, Clawson, Mich. 48017; Donald E. Gault, 1428 E. Lincoln, Birmingham, Mich. 48009; Frederick E. Marshall, 682 Snowmass, Rochester Hills, Mich. 48309

[21] Appl. No.: 683,046
[22] Filed: Apr. 10, 1991
[51] Int. Cl.$^5$ .............................. B01D 51/00
[52] U.S. Cl. ........................ 55/269; 55/465; 55/320
[58] Field of Search .......... 55/268, 269, 320, 462–465, 55/482

[56] References Cited

U.S. PATENT DOCUMENTS

| | | | |
|---|---|---|---|
| 184,554 | 11/1876 | Sterling | 55/269 |
| 1,910,728 | 5/1933 | Waters | 55/440 |
| 2,853,153 | 9/1958 | Sexton | 55/482 |
| 3,612,616 | 10/1971 | Stewart et al. | 55/302 |
| 3,880,624 | 4/1975 | Arnold | 55/242 |
| 4,283,209 | 8/1981 | Schmalhofer | 55/325 |
| 4,348,057 | 9/1982 | Parenti et al. | 55/344 |
| 4,544,383 | 10/1985 | Haselmaker | 55/129 |
| 4,583,998 | 4/1986 | Reid | 55/45 |
| 4,608,062 | 8/1986 | Hughes | 55/186 |
| 4,627,406 | 12/1986 | Namiki | 123/573 |
| 4,717,404 | 1/1988 | Fore | 55/444 |
| 4,747,857 | 5/1988 | Andrews | 55/269 |

FOREIGN PATENT DOCUMENTS 381396  9/1973  U.S.S.R. .............................. 55/129

Primary Examiner—Bernard Nozick
Attorney, Agent, or Firm—Gifford, Groh, Sprinkle, Patmore and Anderson

[57] ABSTRACT

An air cleaner for removing air entrained cooling oil mist, smoke and particulates which become air borne during machine tool cutting operations and the like thereby contaminating ambient air adjacent the machining and the like operations.

The contaminated air is driven against a planar impingement plate arranged to be struck with a glancing blow of such force as to remove a substantial portion of the contaminates by impact.

A series of cylindrical openings extend transversely through the impingement plate. The openings are sufficient in number to ensure continued flow through the cleaner. The plate is arranged at such an angle with respect to the air flow directed toward the plate that the openings appear to be elliptical to the air stream when the air first strikes the plate, thus effectively increasing the impingement surface area, but at the same time an adequate number of openings is provided through the impingement plate to maintained the desired air flow.

6 Claims, 2 Drawing Sheets

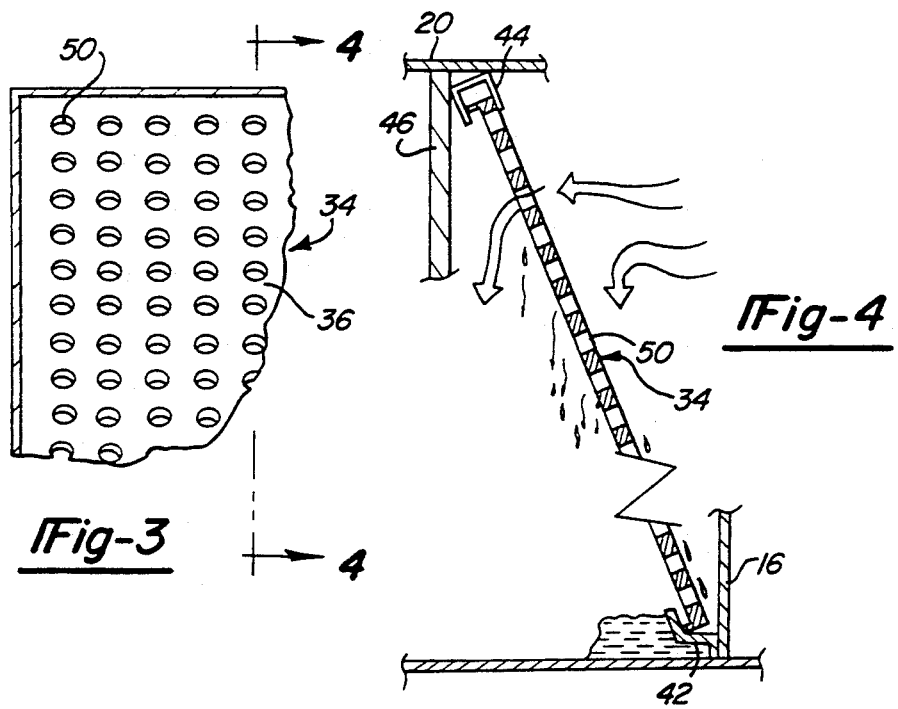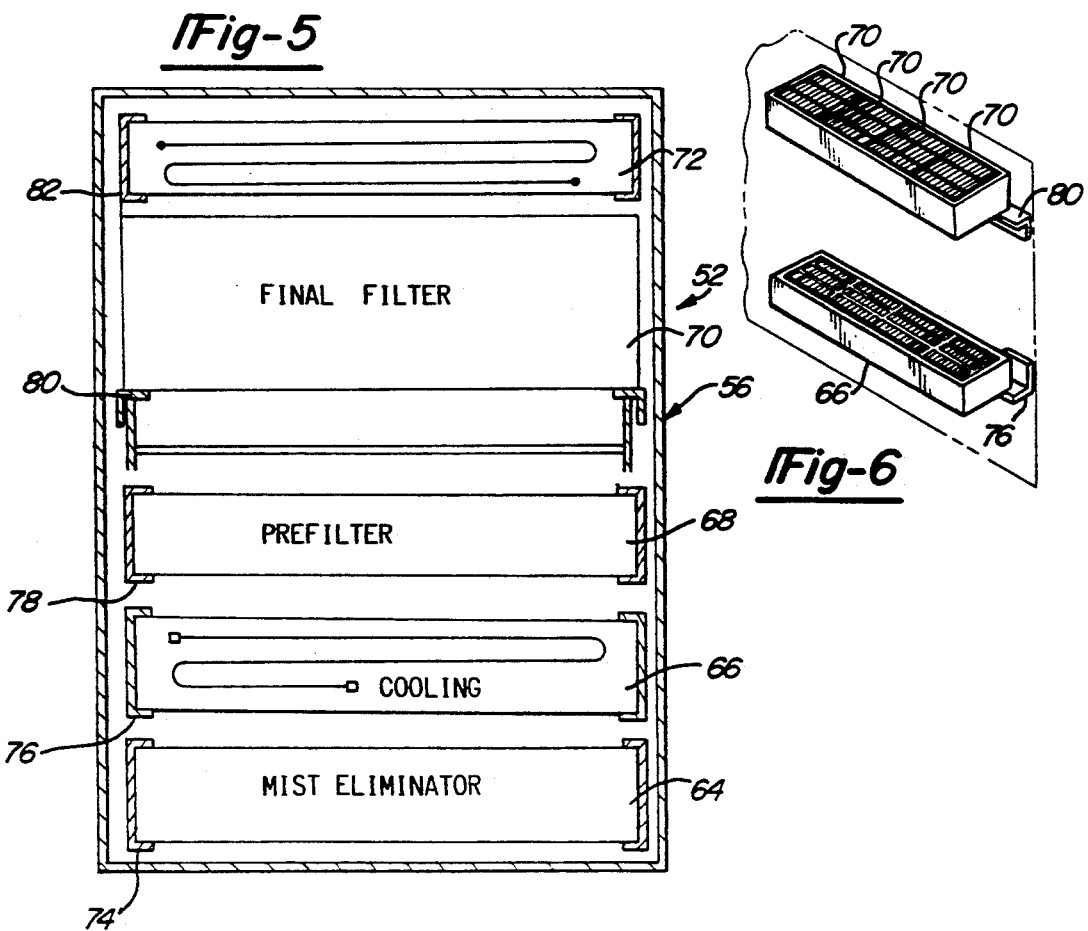

OIL MIST AND SMOKE COLLECTOR

I. FIELD OF THE INVENTION

This invention relates to a method and apparatus for cleaning air within manufacturing plants or the like and particularly for removing cooling oils usually employed in such plants and water as well as smoke and entrained particles such as are generated during the machining of metal parts.

The invention is also useful in purifying air effected by other manufacturing processes such as cold heading, plastics manufacture, textile treating, tire manufacturing and general air gleaning purposes.

II. DESCRIPTION OF THE PRIOR ART AND SUMMARY OF THE INVENTION

Increasing awareness of air conditions in working areas as well as in the general neighborhood of machine shops and manufacturing plants has led to increasing concern for air quality and regulations relating to maintaining air purity.

In the machining of parts, such as in machining of threads, considerable heat is generated. Coolants are usually employed to control the heat at the tool-part interfaces. Chips including very small particles, "smoke", and heated coolant result from the cutting process. The coolants are mixtures of oil and water in many instances and considerable oil saturated mist usually results. The mist contains not only oil but also metal particles as well as smoke from the cutting operation.

Fans are customarily employed to draw contaminated air away from the machining areas in order to protect machinists from this residue. This can be easily done. However, local as well as national regulations pertaining to working conditions, as well as cost dictates against simply exhausting this air to the atmosphere surrounding the plants.

On the other hand, large quantities of relatively clean, ambient air must be used to withdraw the contaminated air from the vicinity of the tools. This can only come from within the factories, adjacent the tool sites, and a considerable quantity of air is withdrawn from the air in the plants to produce the exhaust effect needed to entrain the mist and particles and keep the plant atmosphere clean. This large quantity of air becomes itself contaminated and cannot be simply recycled without cleaning. Yet as stated above, it cannot be simply exhausted into the atmosphere without the risk of violating clean air requirements.

An equally important reason for not simply exhausting the air, is the energy loss that would be involved. The plants are usually heated in winter and often cooled in warmer weather.

Recycling of the air is preferred both from the energy loss standpoint as well as from the air quality standpoint. Recycling, however, requires cleaning of the relatively large quantities of air with the substantially complete removal of oil mist, particles, and smoke, and preferably control of the water content.

A number of devices and methods have been put forth for reclaiming the air used to withdraw the oil mist. Some simply employ fans and commercially available filters. Others also include tortuous paths for the airstream. Many of these devices employ screen-like filters of various constructions, including some which bear an appearance similar to those used in home hot air furnace filtering systems. Some employ disposable absorbent filters to remove moisture, mist and smoke as well as particulates.

It is also known to employ electrostatic means of precipitation, particularly for removing particles and dust.

Modules containing one or more of these concepts or methods are known and available, and various combinations of modules can be made. Some of these, however, can be very expensive in comparison to simpler filter devices.

It is also known to use rotating drums with a filter which surrounds the drum. Such filters can be constantly moving along the drum to provide a clean surface. The filter in this case is in a roll form and operates like a roller towel constantly advancing a clean surface with the dirty surface being taken up by another roller.

According to the instant invention, a method and apparatus is provided which does not require electrostatic means and such devices as movable filter cloths, which will none the less remove oil, mist, particulates and smoke and other liquids and can also control final water content.

According to the invention, a method of cleaning employing impingement of a moving air current is utilized to remove substantial amounts of oil mist and particulates. Further, a fixed plate of special form and arrangement is provided for achieving the impingement effect.

The invention further includes the concept of a plate being also used in conjunction with and forming a part of a transition stage or section in the air filter system whereby air flow is controlled thereby improving the impingement effectiveness as well as the effectiveness of subsequent filter elements aligned in the air stream.

According to the invention, the impingement of the air stream takes place immediately upon entering the first stage of the filter. The result is an immediate first stage removal of more than 50% of the smoke, oil, and particulates and other solid materials that may have been entrained through impingement alone. The air required to remove substantially all the unwanted mist and other undesirable contaminants from the tool areas and retain the material thus removed in suspension until the filter is reached must move at a relatively high velocity compared to the velocity preferred for use in the impingement action. Accordingly, a transition section plays a desirable part in the overall filtering process. The air speed is controlled by the transition section so that impingement occurs at a relatively reduced speed compared to that in the duct work leading up to the transition. This results in an improvement in the formation of fluid droplets which separate from the airstream and also an improvement in particle separation at the point of impingement. Better disbursement of the airstream across the impingement plate is also obtained by so controlling air speed. Slowing of the airstream also improves the control of the air speed throughout subsequent filtering media. Better diffusion and more uniform loading of the impingement plate and subsequent filtering elements is achieved through controlled air flow.

Impingement is also effected at an angle to the flow of the airstream towards the impingement plane, according to the method and apparatus employing the invention, to thereby increase the effective area of impingement which the airstream must pass through.

In addition to the impingement action, the air after passing through the plane of impingement is directed through a mist eliminator stage and a moisture phase changing stage for removing additional mist etc. that may have passed through the impingement plane. The mist eliminator and phase changing stages comprise a series of filter elements preferably arranged vertically in series and preferably including commercially available filter section mist eliminator elements. According to the invention, in fact, in the preferred form a complete recycling filter comprises several stages or sections, (1) an air inlet and transition; (2) the impingement plane section including a plenum; (3) additional barriers to air movement for effecting removal by impingement; (4) additional filtering devices; and (5) a phase change section or sections for modifying the moisture content in the air by changing the phase of the moisture.

The invention further provides a highly efficient means and method of removing smoke, oil mist, and entrained particles without moving parts except for a fan to move the air and without using electrostatic means.

In addition, the invention provides for a less expensive means for accomplishing the air cleaning and recycling needed under modern requirements than previously known.

The invention also provides a means for controlling the moisture content and preventing fogging of the discharge air.

According to the invention, there is provided an impingement plane formed of a single impingement means completely extending across the airstream which will have a impingement effect on the moving air, slow the air down, and separate substantial quantities of oil and particulates and control the further flow of air to subsequent filters and phase changing means.

According to the invention, a plate-like member is provided with a series of openings through the plate covering about 50% of the plates surface facing the airstream. Further, these openings are sufficient to permit air to continue through the filter system but only after it has been purged of a substantial percent of the unwanted contaminates, including oil and particulates. The invention further provides a method and apparatus for separating by a single impingement plane within the airstream, and employing a single plate of relatively simple configuration. This is far less costly than providing a series of plates.

Further, the invention provides for the free flow of materials removed by impingement, down the impingement plane, over the entire surface of the plate.

A further object is the provision of a single plate having a series of openings extending across the impingement plane transversely therethrough for continued progress of the air that does not strike the impingement plate.

Another object of the invention is the provision of an impingement mechanism which presents to the airstream a barrier effective as an impingement surface of more than 50% of the cross-section of the plenum in which the barrier is placed, but also the provision of means for adequate flow of air, and in effect the provision of openings for air passage equivalent to approximately 50% of the surface of the barrier facing the airstream.

A still further achievement is the provision of a plate-like impingement method and device whereby material which is removed by impingement will flow downwardly over substantially the full surface of the plate facing the airstream with the air from which the material has been removed mixing with the air which did not experience the impingement effect and continuing on to another stage in the filter.

Yet the invention also provides a means and apparatus for controlling the rapid decrease in air flow for a maximum discharge of contaminates by impingement at the plate plane, yet a means for re-establishment of the most advantageous air speed for subsequent use of the concepts of a tortuous passage and/or filter means and further cleaning of the air.

The invention provides a method and means for causing air to meet an impingement barrier with maximum effect directly in its path and extending completely across the path which barrier is effectively of a cross-sectional area of more than 50% of the width of the airstream, and yet at the same time the invention provides an air passage through the barrier effectively of about one-half the width of the airstream as it strikes the impingement plane.

Further, the invention provides a fully effective single stage impingement barrier with minimum depth of construction. The invention also provides for controlling air flow by providing a slow enough speed for effectively disbursing all of the airstream over the barrier for obtaining maximum discharge by impingement with subsequent acceleration for subsequent employment of tortuous paths and barrier concepts and additional filter means at a most desirable speed for their successful operation.

An additional feature of the invention is removal of oil mist particles, smoke and contaminants and water, and the avoidance of fogging of the atmosphere upon discharge from the filter unit.

These and other advantages will be more apparent from the following description and the accompanying drawings.

BRIEF DESCRIPTION OF THE DRAWINGS

FIG. 3 is a fragmentary enlarged front elevational view of an impingement plate taken along line 3—3 of FIG. 1 with openings therein enlarged for clarity;

FIG. 4 is a vertical fragment of a section taken along line 4—4 of FIG. 3;

FIG. 5 is a vertical section of a secondary filter means and

FIG. 6 is a fragmentary perspective view of filter elements.

DETAILED DESCRIPTION OF THE PRESENT INVENTION

Figure 1:
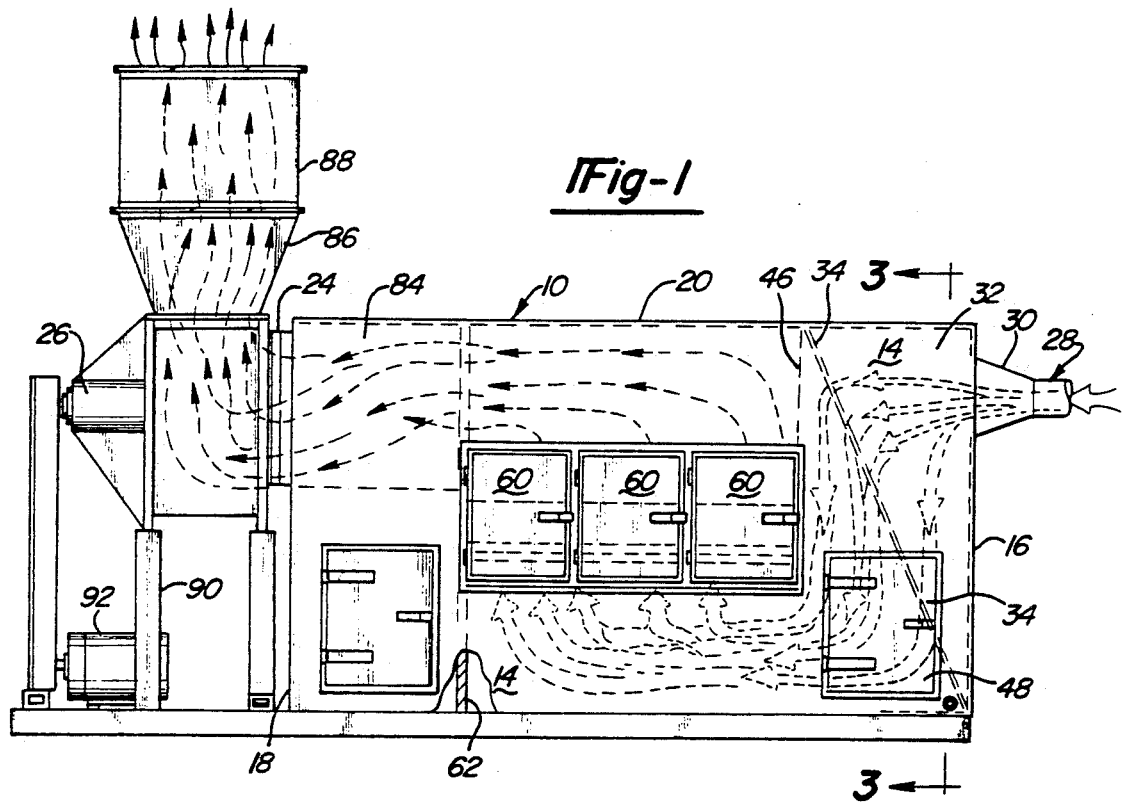
FIG. 1 is a side elevation of a filter.
Figure 2:
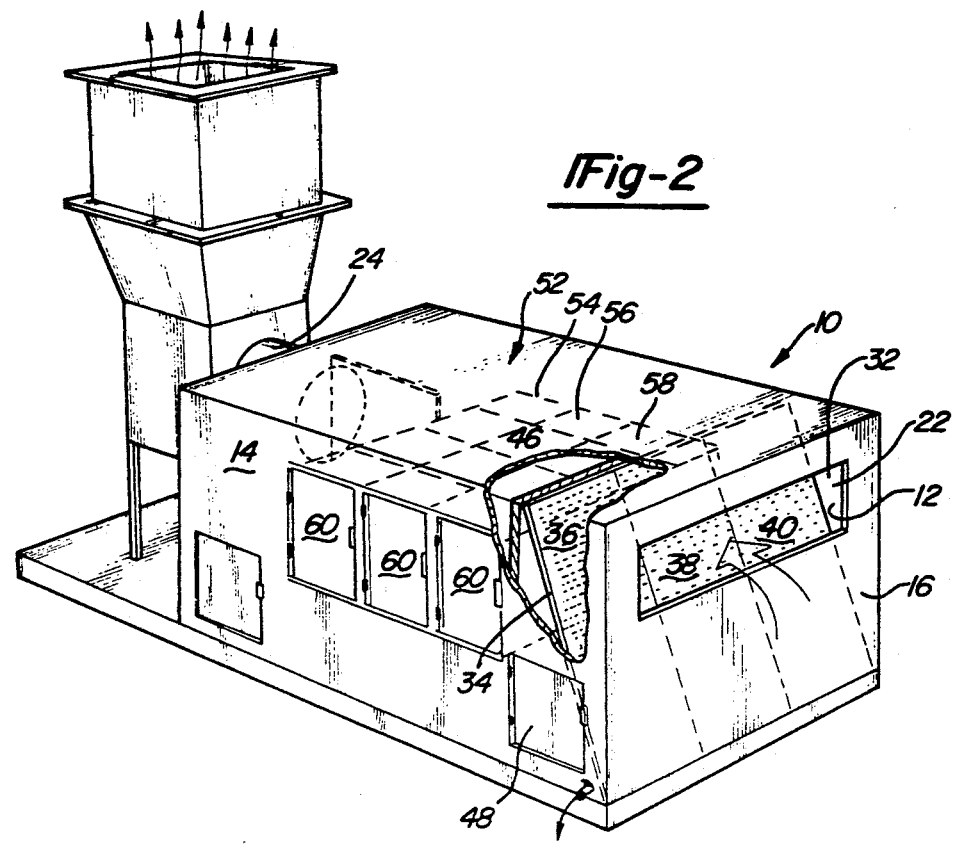
FIG. 2 is a fragmentary perspective view of the filter.

Referring now in particular to FIGS. 1 and 2 of the drawings, a preferred form of the invention comprises a housing 10 formed of sheet metal plate sections and having sides such as 12 and 14, and end portions 16 and 18 as well as a top 20. Suitable internal bracing is provided to stiffen and support the sheet metal plate. An air inlet opening 22 is provided at one end and an exit 24 is arranged at the opposite end. A fan 26 of a simple bladed type is employed to provide the required air flow. As seen, the filter employs a suction, i.e., negative pressure, to induce an air flow throughout the filter.

While not shown in detail it will be understood that duct work 28 is employed to lead air from whatever locations having tools or the like from which it is desired to exhaust air. The duct includes a transition 30 which leads into the filter inlet 22, FIG. 2, opening to the first stage 32 of the filter. The first stage 32 comprises a plenum formed by the walls 12, 14 and 16, and top 20 and an impingement plate 34. Plate 34 is formed of preferably identical segments 36, 38 and 40. The sections of plate 34 are formed of 10 gauge sheet steel plate. The plate extends substantially completely from side 12 to side 14 and from the top of the filter to the bottom of the housing. The plate is supported by a series of brackets 42 at the front of the housing 10, and is received in a channel 44 at its upper end see FIG. 4. Channel 44 abuts an upper blocker plate 46. Plate 34 is made in sections to facilitate installation and maintenance. The sections are sized to be inserted and removed through maintainance access door 48.

Upper blocker plate 46, which is impervious, extends vertically downward from the top 20 and from side 12 to side 14. The blocker plate extends about two-thirds of the way downwardly in the filter and its upper end provides a support for channel 44. The impingement plate, as will be apparent from FIGS. 1 and 2, extends upwardly from the front lower edge of first stage plenum 32 to the upper rearward edge thereof with the first stage plenum being approximately wedge shaped. The impingement plate is formed as a flat plate and extends entirely across the path of air through the filter. This effectively blocks the air flow except for the fact that the plate is provided with a series of small openings, air passages 50, FIG. 3, extending completely through the plate from front to back thereof. Preferably, the openings 50 extend transversely through the impingement plate 34 and are of circular cross-section and of about three-sixteenths inch diameter.

A sufficient number of openings are provided to form a plate which is approximately 50% perforated. That is the air passage is about 50% of the total area of the plate.

The plate is at an angle of approximately 55 degrees to the horizontal. It thus presents a sloping face to the airstream flowing toward it. The purpose of the plate is to trap oil and debris and water by impingement at a first stage in the filter. The solid portions of the front face of the impingement plate, which faces the incoming air, will be struck by the inwardly moving air and oil will be knocked out of the air by the impact. The tilting of the plate plays an important part in the impingement. With the plate angle at about 45 degrees to 60 degrees, the airstream effectively is presented to elliptically appearing openings within the plate, see FIG. 3. As a result, the plate surface effectively presents an impingement area of about 70% of the area of the plate as it faces the airstream instead of 50%. A substantially greater percentage of the air will thus strike the plate face than would if the plate were simply vertically disposed. Tilting within the range of about 45 to 60 degrees is preferred for maximum impingement effect over the maximum effective area.

It is obvious that incoming air will have to go through the first stage impingement plate in order to progress further within the filter, but substantial portions, greater than 50% of the air stream will impinge upon the plate due to the tilt of the impingement plate.

Air, after it passes through the impingement plate, will strike upper blocker plate 46 and additional entrained material will be disassociated from the airstream by the striking of plate 46. Behind the blocker plate 46 is series of second stage filter modules 52, FIGS. 2 and 5. These modules are 12 in number in the form shown and the modules are arranged in three rows 54, 56, and 58 of four modules each. They are accessible through module access doors 60.

The modules are supported on frame members and form filtering section units which extend downwardly to approximately adjacent the lower edge of the blocker plate 46 i.e., to approximately two-thirds of the way downwardly in the filter housing. The modules in each row abut each other and gaskets are provided along the abutting edges. Blocking sheet metal members are provided between the rows and contact with the lower edges of the modules so as, together with the gaskets, force the air upwardly through the filter modules. The module sides are formed of closed panel members so that air can only move vertically through them. A rearward bottom blocker 62 extends downwardly from the rear most line of modules 54.

Blocker 46, FIG. 1 forces the air to move downwardly beneath the modules 52 while blocker 62 forces air movement upwardly through the modules.

Modules of the type shown are known in the art and comprise vertically arranged housings with a series of filter elements supported in steps or stages within them. The filter elements are generally of rectangular shape and are arranged like drawers in a cabinet. The sides of the housing of the module are open so as to provide access to the filter elements within each row of filters. The air flows through the filter elements from bottom to top. A large variety of filter elements are available for creating these modules.

FIG. 5 shows a module section according to the invention. The module embodies a second stage mist eliminator filter 64 of a known type which is basically formed of layers of flat wire and herringbone crimped wire members. This filter will eliminate moisture which has not been eliminated up to this point. Above the second stage filter, there is inserted a third stage phase change section 66. This is formed of cooling coils and is preferably from two to twelve inches in height. The cooling coil is fed by a refrigerating unit which can be of any known type. Above the cooling coil, there is positioned another filtering element, the fourth stage filter 68. Preferably, this is a disposable filter and is of a known type.

Next in line as a fifth stage is a final particle filter 70 which is, in this instance, about twelve inches thick and will collect additional mist and entrained filings, etc. of a very fine nature which may remain in the stream at it reaches this stage.

Lastly, there is provided as a sixth stage, a second phase changing high temperature coil section 72. In this instance, a heating coil is provided which like the cooling coil below it, is preferably of about two to twelve inches in height. The heating coil is a hot water heating coil and is fed by the condenser of the unit that cools coil 66.

The filter sections or modules comprise relatively movable and easily replaceable units, such as the elements 64, 68 and 70 and the phase change units 66 and 72. These individual units can be slid along supporting pairs of tracks, such as 74, 76, 78, 80 and 82, FIGS. 5 and 6, which extend completely through each of the modules, there being provided a set of tracks for each of the three rows. Thus, the filter sections can be slid in and removed from one side or the other through access doors such as 60. The tracks such as 74 are preferably formed of channel sections. The low temperature phase change coils are provided with suitable lengths of hoses such as 88, and the heating phase change coils with suitable lengths of pipe connections which extend rearwardly as viewed through the rear wall 14 of the filter housing where they can be connected to suitable matching hoses. The phase change units are each formed as a single unit extending from side to side in the filter housing. The other filter elements, the mist eliminator, the disposable fourth stage filter, and the final particle filter, are standard 24×24 format filter elements, simply stacked side by side along the tracks.

The air path as shown by the arrows in FIG. 1 is through the transition section 30 into the first stage 32 through the impingement plate 34 then against the upper blocker plate 46 and then downwardly toward the rear blocker plate 64. The air next proceeds upwardly through the filter modules 52. Behind the modules there is the exit plenum chamber 84 and the fan 26. Preferably, an anti-swirl plate is provided in chamber 84 to improve the efficiency. The air exhausts from the fan through a transition section 86 and through an accoustical silencer 88. The fan is supported on suitable base structure such as 50 and is driven by a motor 92.

I claim:

1. An air cleaner for removing coolant comprising oil entrained in ambient air during machining operations comprising:

a housing having an air inlet, an air outlet, air cleaning means intermediate said inlet and said outlet within said housing, and means for forming air to be cleaned from said inlet through said clearing means and through said outlet including an inlet plenum, said air inlet directly leading to and facing said plenum, said air cleaning means comprises a planar impingement plate member extending transversely of and substantially entirely across said plenum, said plate providing an impingement surface transverse of the plenum, said impingement plate extending from adjacent portions of the inner periphery of said plenum at an acute angle within the range of about 45 to 60 degrees with respect to the transverse axis of said plenum, said impingement plate having a series of cylindrical air passages of substantially 3/16 inches diameter extending through said plate substantially transversely of said plate over substantially 50% of the total area of said plate facing said inlet and providing a total air passage transversely through said plate of approximately 50% of the total surface area of said plate extending transversely across said plenum, with the angling of said plate being such with respect to said plenum and said inlet as to cause incoming air to strike said plate at an acute angle with respect to said plate and said air passages and cause said cylindrical air passages to present elliptically appearing entrances for air moving through said plenum as it strikes said plate whereby said plate forms an impingement barrier effectively of an area substantially greater than 50% of the total surface area of said plate, and whereby a substantially greater portion of the air and entrained coolant will impinge on said plate than will tend to move directly through said passages without striking said plate and impinging coolant will be precipitated out of the air stream onto said plate.

2. The air cleaner of claim 1 wherein said transverse axis of said plenum is horizontally disposed.

3. The air cleaner of claim 1 wherein said plate comprises abutting separate members forming an impingement plane extending across said plenum.

4. The air cleaner of claim 1 wherein said impingement plate has a surface area facing said plenum air inlet of approximately three times the area of said inlet to said plenum.

5. The air cleaner of claim 1 including a second stage cleaning means downstream from said impingement plate member comprising a temperature lowering fluid phase changing means operable to change the phase of coolant entrained in air and trap the coolant in the air passing through said second stage cleaning means by forming droplets which can be removed from said air and means for removing the latter droplets.

6. The air cleaner of claim 5 including a second fluid phase changing means downstream from said temperature lowering fluid phase changing means and from said means for removing the latter droplets operable to raise the temperature of the airstream before discharge from said cleaner.

* * * * *

UNITED STATES PATENT AND TRADEMARK OFFICE
CERTIFICATE OF CORRECTION

PATENT NO. : 5,154,742
DATED : October 13, 1992
INVENTOR(S) : William J. Gault et al.

It is certified that error appears in the above-identified patent and that said Letters Patent is hereby corrected as shown below:

Column 4, line 46, insert --;-- after "means".

Column 6, line 6, insert --,-- after "46".

Column 7, claim 1, line 28, "forming" should read --forcing--.

Signed and Sealed this

Fourteenth Day of December, 1993

*Attest:*

BRUCE LEHMAN

*Attesting Officer*     *Commissioner of Patents and Trademarks*